United States Patent
Burghard et al.

(10) Patent No.: US 9,471,465 B2
(45) Date of Patent: *Oct. 18, 2016

(54) TRACE VALUE CORRELATION WITH DATA FIELD DECLARATIONS

(71) Applicant: International Business Machines Corporation, Armonk, NY (US)

(72) Inventors: Stephen J. Burghard, Portsmouth (GB); David J. Harman, Southampton (GB); Neil W. Leedham, Southampton (GB); Andrew Wright, Southhampton (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 21 days.

This patent is subject to a terminal disclaimer.

(21) Appl. No.: 14/565,068

(22) Filed: Dec. 9, 2014

(65) Prior Publication Data
US 2015/0154099 A1    Jun. 4, 2015

Related U.S. Application Data

(63) Continuation of application No. 13/529,616, filed on Jun. 21, 2012, now Pat. No. 8,943,370.

(51) Int. Cl.
| | |
|---|---|
| *G06F 11/00* | (2006.01) |
| *G06F 11/36* | (2006.01) |
| *G06F 11/30* | (2006.01) |
| *G06F 11/07* | (2006.01) |

(52) U.S. Cl.
CPC ....... *G06F 11/3636* (2013.01); *G06F 11/0721* (2013.01); *G06F 11/0763* (2013.01); *G06F 11/3072* (2013.01); *G06F 2201/865* (2013.01)

(58) Field of Classification Search
CPC ........... G06F 11/3636; G06F 11/3466; G06F 11/36; G06F 11/366
See application file for complete search history.

(56) References Cited

U.S. PATENT DOCUMENTS

| | | | |
|---|---|---|---|
| 7,039,833 B2 | 5/2006 | Knuutila et al. | |
| 7,080,283 B1 | 7/2006 | Songer et al. | |

(Continued)

FOREIGN PATENT DOCUMENTS

WO    2011/116988 A1    9/2011

OTHER PUBLICATIONS

Jonas Trumper, et al., Understanding Complex Multithreaded Software Systems by Using Trace Visualization, Proceedings of the 5th International Symposium on Software Visualization (SOFTVISI'10), Oct. 17-21, 2010, pp. 133-142, Association for Computing Machinery, Salt Lake City, Utah, USA.

(Continued)

*Primary Examiner* — Charles Ehne
(74) *Attorney, Agent, or Firm* — Lee Law, PLLC; Christopher B. Lee

(57) ABSTRACT

Data fields within a trace data set are interpreted using data field declarations of the data fields that each specify a data type definition of a respective data field. A data value of an interpreted data field is compared with the data type definition specified within a respective data field declaration for the interpreted data field within the trace date set. Based upon the comparison, a determination is made that the respective interpreted data field contains a data value that violates the data type definition specified within the respective data field declaration.

20 Claims, 4 Drawing Sheets

(56) References Cited

U.S. PATENT DOCUMENTS

| | | |
|---|---|---|
| 7,200,776 B2 | 4/2007 | Harris |
| 7,610,514 B2 | 10/2009 | Modani et al. |
| 7,975,183 B2 | 7/2011 | Xu et al. |
| 2008/0115016 A1* | 5/2008 | Choi et al. .................... 714/701 |
| 2008/0126325 A1 | 5/2008 | Pugh et al. |
| 2009/0106741 A1 | 4/2009 | Dageville et al. |
| 2010/0088683 A1 | 4/2010 | Golender et al. |
| 2010/0100774 A1 | 4/2010 | Ding et al. |

OTHER PUBLICATIONS

United States Patent and Trademark Office, Office Action for U.S. Appl. No. 13/529,616, filed Jun. 12, 2014, pp. 1-14, Alexandria, VA, USA.

United States Patent and Trademark Office, Notice of Allowance for U.S. Appl. No. 13/529,616, filed Sep. 16, 2014, pp. 1-5, Alexandria, VA, USA.

* cited by examiner

300

TRACE VALUE CORRELATION WITH DATA FIELD DECLARATIONS

BACKGROUND

The present invention relates to diagnostic product tracing. More particularly, the present invention relates to trace value correlation with data field declarations.

Monitoring and debug software tools provide diagnostic capabilities for evaluation of run-time issues with software products and systems that are under test. Certain monitoring and debug software generate traces that document execution sequences of the system under test. The traces represent a chronological audit trail of events that occur within the system.

BRIEF SUMMARY

A method includes interpreting, via a processor, data fields within a trace data set using data field declarations of the data fields that each specify a data type definition of a respective data field; comparing, for an interpreted data field within the trace data set, a data value of the interpreted data field with the data type definition specified within a respective data field declaration; and determining, based upon the comparison, that the respective interpreted data field contains a data value that violates the data type definition specified within the respective data field declaration.

A system includes a memory that stores a data trace set and a processor programmed to: interpret data fields within the trace data set using data field declarations of the data fields that each specify a data type definition of a respective data field; compare, for an interpreted data field within the trace data set, a data value of the interpreted data field with the data type definition specified within a respective data field declaration; and determine, based upon the comparison, that the respective interpreted data field contains a data value that violates the data type definition specified within the respective data field declaration.

A computer program product includes a computer readable storage medium having computer readable program code embodied therewith, where the computer readable storage medium is not a transitory signal per se and where the computer readable program code when executed on a computer causes the computer to: interpret data fields within a trace data set using data field declarations of the data fields that each specify a data type definition of a respective data field; compare, for an interpreted data field within the trace data set, a data value of the interpreted data field with the data type definition specified within a respective data field declaration; and determine, based upon the comparison, that the respective interpreted data field contains a data value that violates the data type definition specified within the respective data field declaration.

DETAILED DESCRIPTION

Figure 1:
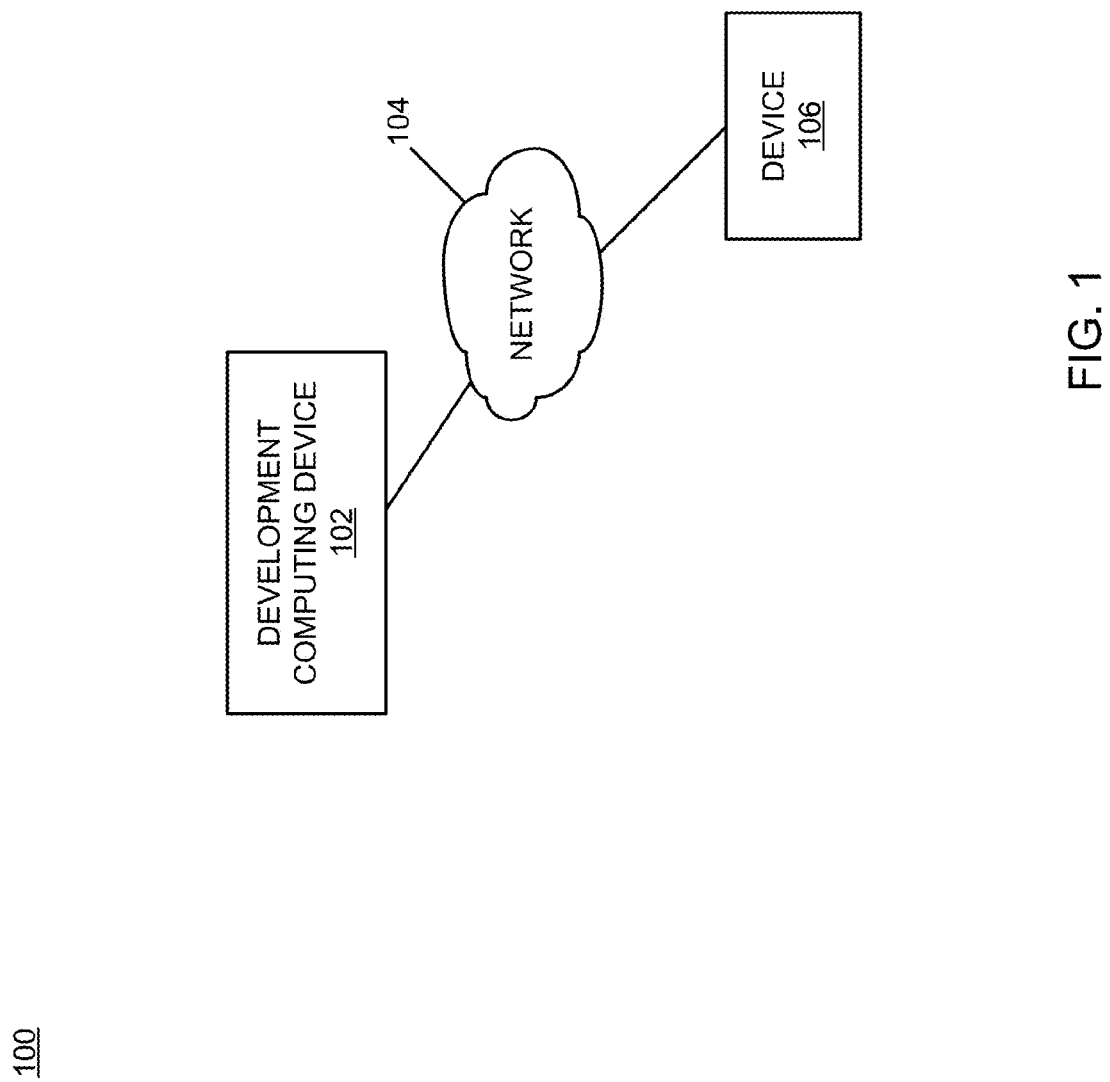
FIG. 1 is a block diagram of an example of an implementation of a system for automated trace value correlation with data field declarations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides trace value correlation with data field declarations. The present subject matter implements validation logic that compares what value a data field within a trace data set actually contains against what value(s) or set/range of values the data field may be expected to contain based on a declared data type of the data field. Data field declarations utilize data type identifiers that define the bit width and the type of data the data field is declared to store, and as such, define correct data values or ranges of data values that may be stored within the data fields. Data values that are written to the trace data set are interpreted, field by field, and compared to each data field's data type declaration, either within the source code, or within encoded metadata of intermediate or executable code. Data field declarations may be further enhanced to include indicators of which color/colors to utilize to highlight out-of-range or out-of-data-type trace values within the trace data set. The data field declarations may also/alternatively be enhanced to include additional indicators of which color/colors to utilize to highlight different error types (e.g., out-of-range values versus values of a completely different data type relative to the declaration). As such, any out-of-range or out-of-data-type trace values, and particular error types, may be highlighted within a trace data set to expedite issue resolution for the particular error or problem. Accordingly, the present subject matter correlates trace values with data field declarations to improve trace data set analysis by program/system developers.

For example, for each declared data field, a declared data field type may be utilized during trace analysis to determine an appropriate/acceptable value or range of values and/or data type to expect within the associated data field of the trace. The determined acceptable value or range of values and/or data type may be encoded as metadata within the respective data fields, such as within intermediate code or executable code (e.g., within dummy control sections (e.g., DSECTs)). During trace analysis, the source code data type declarations or the encoded metadata may be utilized to compare trace values of data fields to identify any data fields that contain unexpected or incorrect values. Any unexpected or incorrect values may be highlighted within the trace output data to indicate to a user that the highlighted data values are out-of-range or contain improper data values, and to indicate that these data fields may warrant further investigation with respect to being a potential root cause of the particular error or problem.

It should be noted that conception of the present subject matter resulted from recognition of certain limitations associated with trace evaluation. For example, it was observed that the tracing feature within certain complex environments, such as a customer information control system (CICS®), provides a comprehensive set of unique trace points, grouped together into a large number of different trace components (e.g., Kernel, Storage, Dispatcher, etc.). However, it was determined that, even where users select which trace components are set/active in an attempt to reduce the amount of output data to be examined, the actual amount of output data is often still significant. It was further determined that it is often a time consuming process to identify a root cause of an error within these very large data sets because the root cause of a problem/error that is introduced into the processing execution path, such as a coding error that results in a bad data value, may be initially undetected. Further, it was observed that a manifestation of the error within a trace data set (e.g., by way of a "generic error" message, or an *EXC (exception)) as a trace entry may be issued much later than the introduction of the error. It was additionally determined that because trace data sets are represented as hexadecimal data, the bad data value that caused the problem is often very difficult to identify because the trace often contains multiple screens of indistinguishable hexadecimal data. As a result, it was determined that these difficulties in efficiently resolving problems due to trace data issues may result in problem resolution times being extended. The present subject matter improves trace analysis and problem/issue resolution by providing for trace value correlation with data field declarations, as described above and in more detail below. As such, improved trace analysis and problem analysis may be obtained through the trace value correlation with data field declarations described herein.

Certain of the examples herein utilize the CICS® environment. However, it is understood that differences exist between different platforms and that the present subject matter may be implemented in any platform and in any manner appropriate for a given implementation.

Within the CICS® environment, for each trace entry, where applicable DATA fields exist, the DATA fields are traced out where appropriate. In such an implementation, the present technology would interpret the DATA fields that are written to the trace data set, field by field, and compare the actual field values against each field's data type within a data structure that exists within the source code. Suspicious fields may then be highlighted for review.

For example, consider a field that is a counter for the number of times a file is opened. The counter field would be expected to be zero or positive because there would not be a negative number of times—a MINUS value—for a file open operation. In such a situation, the present technology may identify that the counter arithmetic has erred where values that are expected to be positive are negative.

The data field declaration of the counter field may have an additional parameter added that indicates to highlight the trace data, for example in the color red, if the value is equal to a negative number (e.g., EQNEGRED). As such, the counter field data value within the trace data will be highlighted in red under a circumstance where the data value is negative. Otherwise, the counter field data value may be displayed, for example, in the color green to indicate that there is no problem with the data value relative to the data field declaration. Such a counter may be declared, for example, as "BIN32 counter EQNEGRED." Similarly, for fields that are expected to always be zero or negative, a data field declaration of the respective data field may have an addition parameter added that indicates to highlight the trace data, for example in the color red, if the value is equal to a positive number (e.g., EQPOSRED).

The following paragraph provides a non-exhaustive list of several additional examples of data fields and value/range declarations that may be established, validated, and highlighted within a trace if their values are outside of the range of what they could be reasonably expected to contain. It is understood that many additional forms of data fields and value/range declarations are possible and all are considered within the scope of the present subject matter.

For example, data fields defined as BIN16 and BIN32 may be expected to contain positive numeric data and these data fields may be highlighted if they contain character (CHAR) data or if they are determined to have negative data values (e.g., EQCHARORANGE). Additionally, data fields defined as BIN(31) may be highlighted where half-word loading code (e.g., LOAD HALFWORD) propagates a sign bit (unintentionally) to the top half of the data field causing the data field to have a negative value. Similarly, return addresses may be verified, for example, using a declaration that specifies that a trace point may be issued "here" if the module has been called from a particular module (e.g., module "Y") and the return address field does not point to a location within that particular module (e.g., within the module "Y"). Traced parameter lists (e.g., PLISTS) often contain pointers to other areas, and these pointers may be verified to confirm that they only contain valid pointer values rather than some other form of data of an incorrect data type. Timestamps with inordinately large elapsed times between entry and exit of a module for adjacent or near adjacent trace entries may be highlighted. A PLIST where the last pointer (e.g., that indicates a last argument and yet does not have its x'80' bit set) or a PLIST that ends prematurely (e.g., no x'80' bit set in the leftmost byte of the last pointer) may be highlighted. Additionally, unbalanced GETMAIN/FREEMAIN events, and out-of-bound (or non-zero) execution (EXEC) interface block (EIB) response fields (EIBRESP) values may be highlighted. Non-zero return codes from other products (often passed in a particular register, such as register 15) or register "branch to" values (such as R14 branch to values) may be highlighted if an unusual value exists. Further, unbalanced module ENTRY/EXIT events, non-zero message inserts, data fields containing values of architected response and reason codes as they are propagated to their callers, character (CHAR) data that is not a valid value for the codepage in use, and initial image values of "getmained" storage values when not set to contain x'00' may be highlighted. Reverse highlighting may also be used to further enhance user identification of types of trace data, such as for example, to encapsulate and identify dummy control sections (e.g., DSECTs) when they are traced. Reverse highlighting may be used for other distinctions as appropriate for a given implementation.

The product being traced may additionally be architected so that field declarations are grouped in an intuitive manner, such as per the examples above, so that the field declarations may be more easily identified. Further, more critical errors in data field values may be highlighted more boldly than less critical errors. For example, EIBRESP values may be highlighted in red, return codes (RC's) from other products may be highlighted in blue, and pointers containing character data may be highlighted in yellow. Many other variations are possible and all are considered within the scope of the present subject matter.

These groupings may be further enhanced by reverse highlighting thus providing a richer set of visual aids to assist in identifying suspicious data field values for further investigation. Because the present technology utilizes data field declarations, the trace data processing module "knows" the data field names (e.g., because it has to interpret them). As such, a suspicious field, once selected by way of, for example, a question mark against the highlighted field, may then display the data field name to further assist the user/troubleshooter.

As such, the present technology allows fields of interest to be declared with a new parameter that influences how the field may be displayed in a trace if it contains an out-of-range value or data value type. Accordingly, expedited problem resolution may be achieved, and users and service programmers may be assisted with determination of user or coding errors, respectively. These positive results may in turn help reduce service costs, and improve customer satisfaction and problem resolution response times.

The correlation of the data field may be performed during trace data set post processing or as part of mainstream trace processing itself. As such, trace data set post processing may be performed in response to a user request for trace data, or trace data may be modified and stored pre-processed. Alternatively, mainstream trace processing may be performed during actual trace data capture.

As such, the trace value correlation with data field declarations described herein may be performed in real time to allow prompt correlation of data field declarations with trace values. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated trace value correlation with data field declarations. A development computing device 102 communicates via a network 104 with a device 106. The development computing device 102 operates to analyze, either in real time or via post-execution data processing, trace data generated by the device 106. The device 106 may be any system that is under development or deployed for which trace data is to be analyzed. It should be noted that while the system 100 illustrates the development computing device 102 and the device 106 as separate devices/components, the development computing device 102 and the device 106 may be combined into a single device/system without departure from the scope of the present subject matter. Within such an implementation, an application executing within the development computing device 102 may be debugged, and trace data generated by the application may be analyzed and correlated with data field declarations as described above and in more detail below. Further, the device 106 may be a system-level entity that includes multiple devices.

As will be described in more detail below in association with FIG. 2 through FIG. 4, the development computing device 102 provides automated trace value correlation with data field declarations. The automated trace value correlation with data field declarations is based upon correlation and comparison of declaration data types associated with trace data values. Values that are out-of-range or of a data type different from a particular declared data type are flagged and/or highlighted to assist a user with identification of such values.

It should be noted that the development computing device 102 may be a portable computing device, either by a user's ability to move the development computing device 102 to different locations, or by the development computing device 102's association with a portable platform, such as a plane, train, automobile, or other moving vehicle. It should also be noted that the development computing device 102 may be any computing device capable of processing information as described above and in more detail below. For example, the development computing device 102 may include devices such as a personal computer (e.g., desktop, laptop, etc.) or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The device 106 may include any device capable of providing trace data for consumption by a device, such as the development computing device 102, via a network, such as the network 104. As such, the device 106 may include a web server, application server, general or application-specific computing device, or other trace data generating device.

Figure 2:
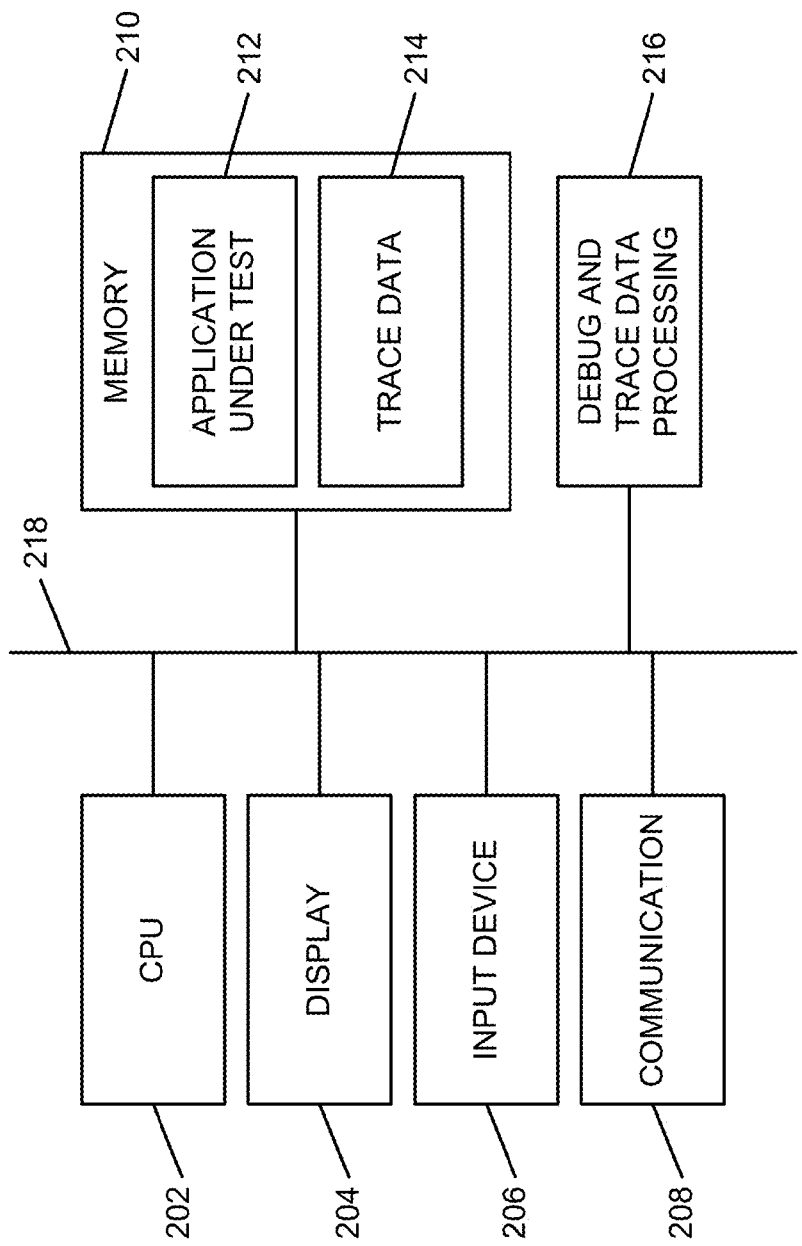
FIG. 2 is a block diagram of an example of an implementation of a core processing module capable of performing automated trace value correlation with data field declarations according to an embodiment of the present subject matter.

FIG. 2 is a block diagram of an example of an implementation of a core processing module 200 capable of performing automated trace value correlation with data field declarations. The core processing module 200 may be associated with either the development computing device 102 or the device 106, as appropriate for a given implementation. Further, the core processing module 200 may provide different and complementary processing of trace data in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide the interconnection capabilities.

A memory 210 includes an application under test storage area 212 that stores application code for one or more applications within the core processing module 200. The application code may also be executed within the memory 210. A trace data storage area 214 stores trace data generated during execution of one or more applications under development, testing, and debug.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A debug and trace data processing module 216 is also illustrated. The debug and trace data processing module 216 provides trace analysis capabilities for the core processing module 200, as described above and in more detail below. The debug and trace data processing module 216 implements the automated trace value correlation with data field declarations of the core processing module 200. The debug and trace data processing module 216 may include compilation capabilities, data point/value/register setting capabilities, single-step and multi-step debugging capabilities, and other debug functionality. The debug and trace data processing module 216 also provides trace analysis as described above for trace value correlation with data field declarations. Using the present technology, values that are out-of-range or of a data type different from a particular declared data type may be flagged and/or highlighted to assist a user with identification of such values.

It should be noted that the debug and trace data processing module 216 may form a portion of other circuitry described without departure from the scope of the present subject matter. Further, the debug and trace data processing module 216 may alternatively be implemented as an application stored within the memory 210. In such an implementation, the debug and trace data processing module 216 may include instructions executed by the CPU 202 for performing the functionality described herein. The CPU 202 may execute these instructions to provide the processing capabilities described above and in more detail below for the core processing module 200. The debug and trace data processing module 216 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the debug and trace data processing module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
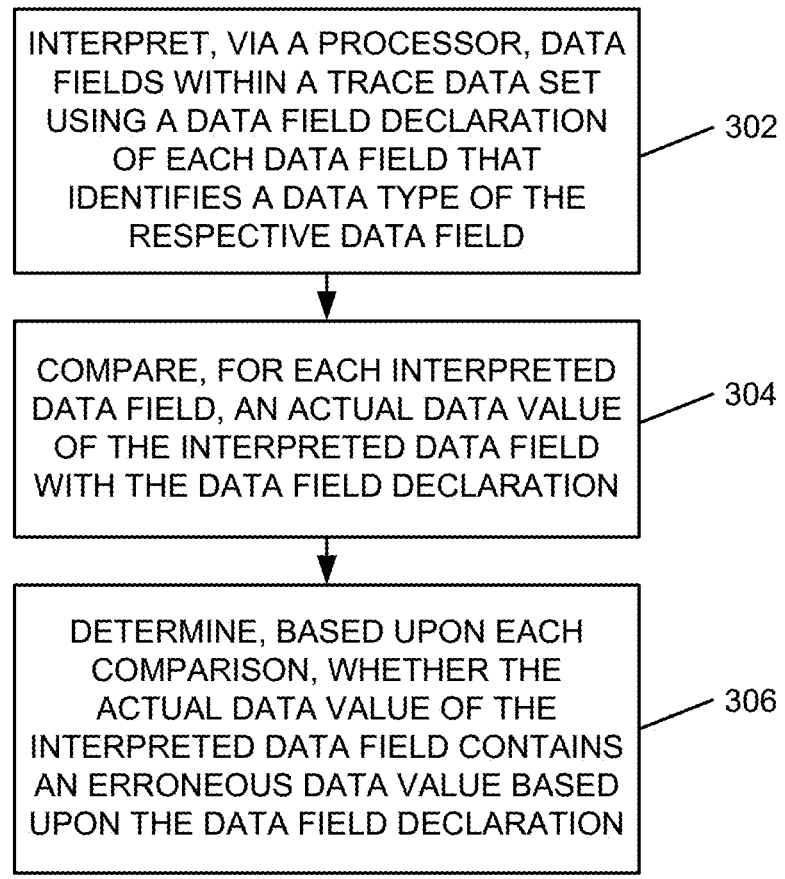
FIG. 3 is a flow chart of an example of an implementation of a process for automated trace value correlation with data field declarations according to an embodiment of the present subject matter.
Figure 4:
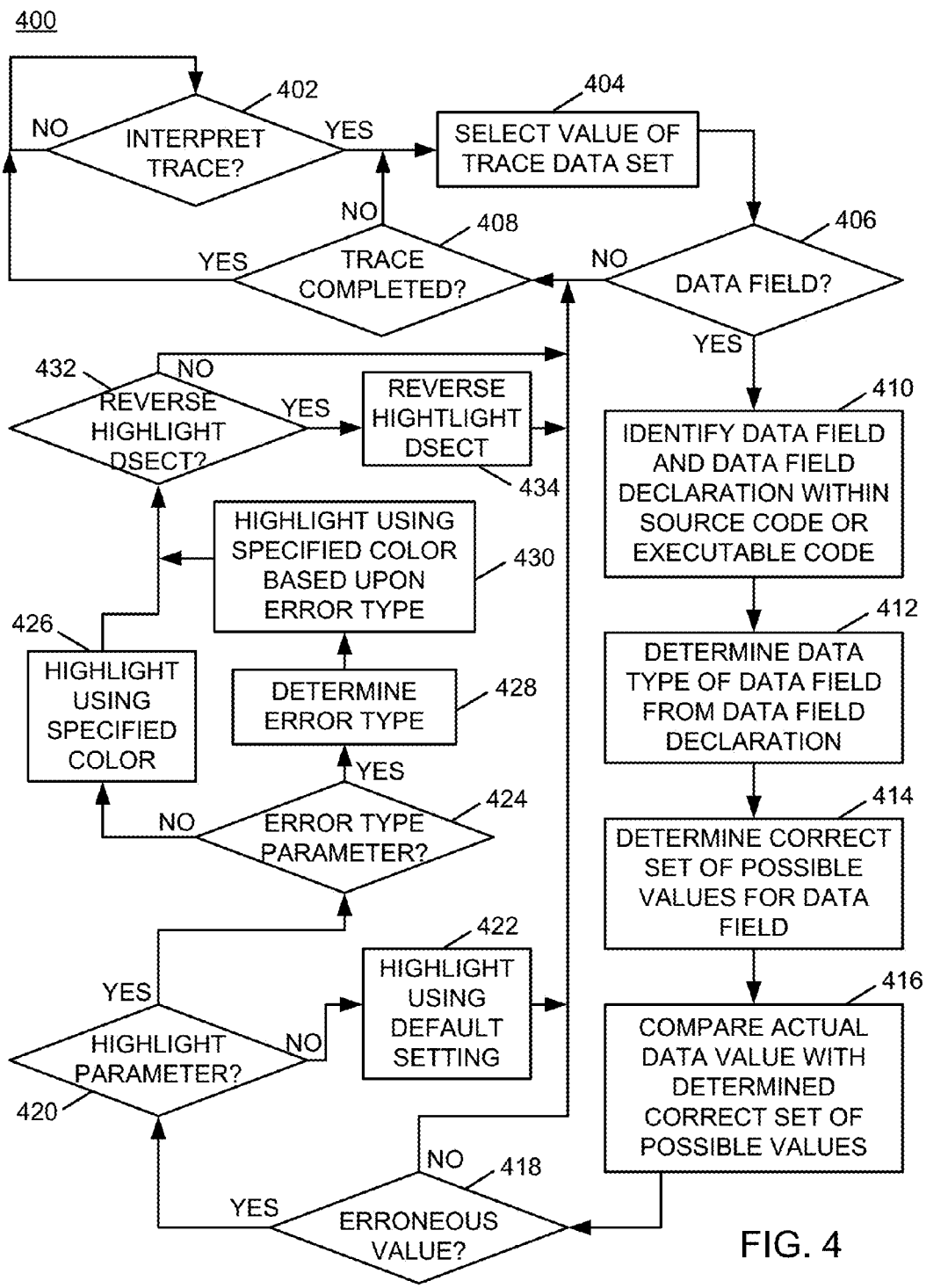
FIG. 4 is a flow chart of an example of an implementation of a process for automated trace value correlation with data field declarations according to an embodiment of the present subject matter.

FIG. 3 through FIG. 4 described below represent example processes that may be executed by devices, such as the core processing module 200, to perform the automated trace value correlation with data field declarations associated with the present subject matter. Many other variations on the example processes are possible and all are considered within the scope of the present subject matter. The example processes may be performed by modules, such as the debug and trace data processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for automated trace value correlation with data field declarations. At block 302, the process 300 interprets, via a processor, data fields within a trace data set using a data field declaration of each data field that identifies a data type of the respective data field. At block 304, the process 300 compares, for each interpreted data field, an actual data value of the interpreted data field with the data field declaration. At block 306, the process 300 determines, based upon each comparison, whether the actual data value of the interpreted data field contains an erroneous data value based upon the data field declaration.

FIG. 4 is a flow chart of an example of an implementation of a process 400 for automated trace value correlation with data field declarations. At decision point 402, the process 400 makes a determination as to whether a request to interpret a trace data set has been detected, such as from a user/developer via the input device 206. In response to determining that a request to interpret a trace data set has been detected, the process 400 selects a value of the trace data set, such as a first value for a first iteration of the process 400, at block 404.

At decision point 406, the process 400 makes a determination as to whether the selected value of the trace data set is a data field. For example, the process 400 may evaluate a dummy control section (DSECT) within intermediate or executable code to identify data fields within the trace data set. In response to determining that the selected value of the trace data set is not a data field, the process 400 makes a determination at decision point 408 as to whether trace analysis has been completed. In response to determining that trace analysis has not been completed, the process 400 returns to block 404, selects the next value of the trace data set, and iterates as described above. In response to determining that trace analysis has been completed, the process 400 returns to decision point 402 and iterates as described above. For purposes of the present example, it is assumed that the trace data set is lengthy and includes several values.

As such, returning to the description of decision point 406, in response to determining that the currently selected value of the trace data set is a data field, the process 400 identifies the respective data field and a data field declaration that identifies a data type of the respective data field within the source code used to generate the executable code at block 410, such as by using a DSECT to bridge between the intermediate or executable code in the source code. At block 412, the process 400 determines the data type of the respective data field from the data field declaration. At block 414, the process 400 determines a correct set of possible values for the data field, for example character values only for data fields of data type "CHAR," a valid range of numerals (e.g., non-negative) for data fields of data type "BIN32," etc.

At block 416, the process 400 compares the actual data value of the identified data field with the determined correct set of possible values. At decision point 418, the process 400 makes a determination as to whether the actual data value is an erroneous data value (e.g., the actual data value is not within the determined correct set of possible values and, as such, the actual data value violates the determined data field declaration). In response to determining that the actual data value is not an erroneous data value, the process 400 returns to decision point 408 to determine whether the trace analysis is completed and iterates as described above to select and process another value of the trace data set if the trace analysis is not completed.

Returning to the description of decision point 418, in response to determining that the actual data value is an erroneous data value, the process 400 makes a determination at decision point 420 as to whether a highlight parameter is declared in association with the type declaration of the data field within the source code. As described above, additional parameters may be declared in association with data types that specify a particular color in which to display trace data values that are out-of-range or of the incorrect data type (e.g., EQNEGRED, EQPOSRED, etc.). Where parameters have been added to the source code by the source code developer, these parameters may be utilized to guide highlighting of erroneous trace data values.

In response to determining at decision point 420 that a highlight parameter is not declared in association with the type declaration of the data field within the source code, the process 400 highlights the erroneous data value using a default setting at block 422, and returns to decision point 408 and iterates as described above. Default settings may be configured based upon data field declarations to allow developers to configure default color coding for erroneous data types. Alternatively, as described above and in more detail below, data field declarations in source code may be enhanced to include parameters for highlighting erroneous data values and may be further enhanced to include parameters for highlighting erroneous data values based upon error types.

In response to determining at decision point 420 that a highlight parameter is declared in association with the type declaration of the data field within the source code, the process 400 makes a further determination at decision point 424 as to whether an error type parameter is declared in association with the type declaration of the data field within the source code. As described above, data fields defined as BIN16 and BIN32 may be expected to contain positive numeric data and these data fields may be highlighted if they contain character (CHAR) data or if they are determined to have negative data values, and may further be highlighted differently if they contain CHAR data rather than negative numeric data (e.g., EQCHARORANGE). Multiple error type parameters may be declared in association with any data field declaration.

In response to determining at decision point 424 that an error type parameter is not declared in association with the type declaration of the data field within the source code, the process 400 highlights the erroneous data value using the color specified in association with the highlight parameter at block 426. In response to determining at decision point 424 that an error type parameter is declared in association with the type declaration of the data field within the source code, the process 400 determines in error type associated with the erroneous data value at block 428, such as, for example, a data value being of a completely different data type from the declared data type of the data field. At block 430, the process 400 highlights the erroneous data value using the color specified in association with the error type parameter based upon the determined error type.

In response to either highlighting the erroneous data value using the color specified in the highlight parameter at block 426 or in response to highlighting the erroneous data value using the color specified in the error type parameter at block 430, the process 400 makes a determination as to whether to reverse highlight the dummy control section (DSECT) within the trace data set at decision point 432. In response to determining to reverse highlight the dummy control section (DSECT) within the trace data set, the process 400 reverse highlights the DSECT at block 434. In response to either reverse highlighting the DSECT at block 434 or in response to determining at decision point 432 not to reverse highlight the DSECT, the process 400 returns to decision point 408 and iterates as described above.

As such, the process 400 interprets a trace data set field by field, identifies data fields within the interpreted trace data set and determines whether the identified data fields contain correct or erroneous data values. In response to determining that a data field contains erroneous data value, the process 400 further analyzes data field declarations to determine whether additional parameters have been declared that specify particular colors in which to highlight the erroneous data values within the trace data set. This highlighting may be further enhanced using declarations for particular colors based upon particular error types for the data values.

As described above in association with FIG. 1 through FIG. 4, the example systems and processes provide trace value correlation with data field declarations. Many other variations and additional activities associated with trace value correlation with data field declarations are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    interpreting, via a processor, data fields within a trace data set using data field declarations of the data fields that each specify a data type definition of a respective data field;
    comparing, for an interpreted data field within the trace data set, a data value of the interpreted data field with the data type definition specified within a respective data field declaration; and
    determining, based upon the comparison, that the respective interpreted data field contains a data value that violates the data type definition specified within the respective data field declaration.

2. The method of claim 1, where interpreting, via the processor, the data fields within the trace data set using the data field declarations of the data fields that each specify the data type definition of the respective data field comprises:
    identifying the data fields within the trace data set;
    identifying, for each identified data field within the trace data set, the data field declaration within one of source code and executable code; and
    determining the data type definition of the data field from the identified data field declaration within the one of the source code and the executable code.

3. The method of claim 1, where comparing, for the interpreted data field within the trace data set, the data value of the interpreted data field with the data type definition specified within the respective data field declaration comprises:
    determining a correct set of possible data values for the interpreted data field based upon the data field declaration; and
    comparing the data value of the interpreted data field with the determined correct set of possible data values for the interpreted data field.

4. The method of claim 3, where determining, based upon the comparison, that the respective interpreted data field contains the data value that violates the data type definition specified within the respective data field declaration comprises:
    determining that the compared data value is not in the determined correct set of possible data values for the interpreted data field.

5. The method of claim 1, further comprising:
    highlighting, within the trace data set, the data value determined to violate the data type definition specified within the respective data field declaration.

6. The method of claim 5, where the data field declaration of the interpreted data field further comprises a highlight parameter that specifies a color to highlight data values within the trace data set that violate the data type definition specified within the respective data field declaration, and where highlighting, within the trace data set, the data value determined to violate the data type definition specified within the respective data field declaration, comprises highlighting the data value within the trace data set in the color specified by the highlight parameter.

7. The method of claim 5, where the data field declaration of the interpreted data field further comprises at least one error type parameter that each specifies at least one error type and a color to highlight data values within the trace data set that violate the data type definition specified within the respective data field declaration, and where highlighting, within the trace data set, the data value determined to violate the data type definition specified within the respective data field declaration, comprises:
    determining an error type associated with the data value using the data type definition specified within the respective data field declaration; and
    highlighting the data value within the trace data set, based upon the determined error type, in the color specified by the respective error type parameter.

8. A system, comprising:
    a memory that stores a trace data set; and
    a processor programmed to:
        interpret data fields within the trace data set using data field declarations of the data fields that each specify a data type definition of a respective data field;
        compare, for an interpreted data field within the trace data set, a data value of the interpreted data field with the data type definition specified within a respective data field declaration; and
        determine, based upon the comparison, that the respective interpreted data field contains a data value that violates the data type definition specified within the respective data field declaration.

9. The system of claim 8, where, in being programmed to interpret the data fields within the trace data set using the data field declarations of the data fields that each specify the data type definition of the respective data field, the processor is programmed to:
   identify the data fields within the trace data set;
   identify, for each identified data field within the trace data set, the data field declaration within one of source code and executable code; and
   determine the data type definition of the data field from the identified data field declaration within the one of the source code and the executable code.

10. The system of claim 8, where:
   in being programmed to compare, for the interpreted data field within the trace data set, the data value of the interpreted data field with the data type definition specified within the respective data field declaration, the processor is programmed to:
      determine a correct set of possible data values for the interpreted data field based upon the data field declaration; and
      compare the data value of the interpreted data field with the determined correct set of possible data values for the interpreted data field; and
   in being programmed to determine, based upon the comparison, that the respective interpreted data field contains the data value that violates the data type definition specified within the respective data field declaration, the processor is programmed to:
      determine that the compared data value is not in the determined correct set of possible data values for the interpreted data field.

11. The system of claim 8, where the processor is further programmed to:
   highlight, within the trace data set, the data value determined to violate the data type definition specified within the respective data field declaration.

12. The system of claim 11, where the data field declaration of the interpreted data field further comprises a highlight parameter that specifies a color to highlight data values within the trace data set that violate the data type definition specified within the respective data field declaration, and where, in being programmed to highlight within the trace data set, the data value determined to violate the data type definition specified within the respective data field declaration, the processor is programmed to highlight the data value within the trace data set in the color specified by the highlight parameter.

13. The system of claim 11, where the data field declaration of the interpreted data field further comprises at least one error type parameter that each specifies at least one error type and a color to highlight data values within the trace data set that violate the data type definition specified within the respective data field declaration, and where, in being programmed to highlight, within the trace data set, the data value determined to violate the data type definition specified within the respective data field declaration, the processor is programmed to:
   determine an error type associated with the data value using the data type definition specified within the respective data field declaration; and
   highlight the data value within the trace data set, based upon the determined error type, in the color specified by the respective error type parameter.

14. A computer program product, comprising:
   a computer readable storage medium having computer readable program code embodied therewith, where the computer readable storage medium is not a transitory signal per se and where the computer readable program code when executed on a computer causes the computer to:
   interpret data fields within a trace data set using data field declarations of the data fields that each specify a data type definition of a respective data field;
   compare, for an interpreted data field within the trace data set, a data value of the interpreted data field with the data type definition specified within a respective data field declaration; and
   determine, based upon the comparison, that the respective interpreted data field contains a data value that violates the data type definition specified within the respective data field declaration.

15. The computer program product of claim 14, where, in causing the computer to interpret the data fields within the trace data set using the data field declarations of the data fields that each specify the data type definition of the respective data field, the computer readable program code when executed on the computer causes the computer to:
   identify the data fields within the trace data set;
   identify, for each identified data field within the trace data set, the data field declaration within one of source code and executable code; and
   determine the data type definition of the data field from the identified data field declaration within the one of the source code and the executable code.

16. The computer program product of claim 14, where, in causing the computer to compare, for the interpreted data field within the trace data set, the data value of the interpreted data field with the data type definition specified within the respective data field declaration, the computer readable program code when executed on the computer causes the computer to:
   determine a correct set of possible data values for the interpreted data field based upon the data field declaration; and
   compare the data value of the interpreted data field with the determined correct set of possible data values for the interpreted data field.

17. The computer program product of claim 16, where, in causing the computer to determine, based upon the comparison, that the respective interpreted data field contains the data value that violates the data type definition specified within the respective data field declaration, the computer readable program code when executed on the computer causes the computer to:
   determine that the compared data value is not in the determined correct set of possible data values for the interpreted data field.

18. The computer program product of claim 14, where the computer readable program code when executed on the computer further causes the computer to:
   highlight, within the trace data set, the data value determined to violate the data type definition specified within the respective data field declaration.

19. The computer program product of claim 18, where the data field declaration of the interpreted data field further comprises a highlight parameter that specifies a color to highlight data values within the trace data set that violate the data type definition specified within the respective data field declaration, and where, in causing the computer to highlight, within the trace data set, the data value determined to violate the data type definition specified within the respective data field declaration, the computer readable program code when executed on the computer causes the computer to highlight the data value within the trace data set in the color specified by the highlight parameter.

20. The computer program product of claim 18, where the data field declaration of the interpreted data field further comprises at least one error type parameter that each specifies at least one error type and a color to highlight data values within the trace data set that violate the data type definition specified within the respective data field declaration, and where, in causing the computer to highlight, within the trace data set, the data value determined to violate the data type definition specified within the respective data field declaration, the computer readable program code when executed on the computer causes the computer to:

determine an error type associated with the data value using the data type definition specified within the respective data field declaration; and highlight the data value within the trace data set based upon the determined error type in the color specified by the respective error type parameter.

* * * * *